UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CATALYTIC PRODUCTION OF AMMONIA.

1,225,755.      Specification of Letters Patent.     Patented May 15, 1917.

No Drawing.     Application filed November 18, 1911. Serial No. 661,014.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in Catalytic Production of Ammonia, of which the following is a specification.

Haber and Le Rossignol describe the catalytic production of ammonia from its elements using iron as a catalytic agent. They start from the purest commercial iron oxid and either reduce this with hydrogen at a very high temperature, namely at 1,000° C. (*Berichte* 1907, 2147), or pass the mixture of nitrogen and hydrogen directly over it at 900° C. (*Zeitschrift für Elektrochemie* 1908, 190). The yields of ammonia obtained using the purest iron obtainable in this manner are extremely small. We have now made the surprising discovery that pure iron possesses a considerably better action, that is to say, a considerable acceleration in the formation of ammonia is secured at comparatively low temperatures lying considerably below 900° C., if the pure iron intended for the catalyst is produced from an oxid of iron, such for instance as ferric oxid or ferroso-ferric oxid, which has been produced by heating pure iron or pure ferric oxid to a high temperature, preferably till it melts, while oxygen is present, or even, if iron oxid is employed, in the absence of oxygen. The reduction is carried out preferably by means of hydrogen, but it can also be brought about in any other manner, for instance with ammonia, in which case the iron is generally obtained in the form of a nitrid. In this invention, pure iron nitrid is equivalent to pure iron. If desired, however, the pure ferric oxid, ferroso-ferric oxid, etc., after having been heated to a high temperature as aforesaid, can be introduced into the contact space and the gaseous mixture be passed over it from the start at a suitable temperature for the production of ammonia, for instance between 550° and 600° C.

The following examples will serve to illustrate further the nature of this invention and how it can be carried into practical effect, but our invention is not confined to these examples.

Example 1.

Heat pure iron (*cf.* for instance Richards, *Zeitschrift für Anorganische Chemie* 23, 1900, 245; Kreusler, *Berichte der Deutschen Physikalischen Gesellschaft* 6, 1908, 344; Lambert and Thomson, *Journal of the Chemical Society* 97, 1910, 2426) in the presence of oxygen until it melts, then allow the mass to solidify, break it up into small grains and reduce it rapidly with a mixture of pure hydrogen and nitrogen at from 800–900° C. The contact mass thus obtained produces better results in the catalytic production of ammonia than does the iron from which it was produced.

Example 2.

Calcine pure iron nitrate, melt the powdery oxid obtained in an oxy-hydrogen flame and reduce the oxid thus obtained after solidification by means of hydrogen under pressure of 50 atmospheres at from 550° to 600° C. and pass a mixture of pure nitrogen and hydrogen over the reduced mass, while maintaining the said temperature and pressure.

Now what we claim is:—

1. The process of producing ammonia catalytically by passing a mixture of nitrogen and hydrogen over iron which has been obtained by heating pure iron oxid to a high temperature and then reducing the iron oxid when solid.

2. The process of producing ammonia catalytically by passing a mixture of nitrogen and hydrogen over iron which has been obtained by heating pure iron oxid until it melts, then allowing it to solidify and then reducing it.

3. The process of producing ammonia catalytically by passing a mixture of nitrogen and hydrogen over iron which has been obtained by heating pure iron in the presence of oxygen to a high temperature and then reducing the iron oxid thus obtained when solid.

4. The process of producing ammonia catalytically by passing a mixture of nitrogen and hydrogen over iron which has been obtained by heating pure iron in the presence of oxygen until a molten mass is obtained, and then allowing the iron oxid thus obtained to solidify, and reducing it.

5. The process of producing ammonia catalytically by passing a mixture of nitrogen and hydrogen over iron which has been obtained by heating pure iron in the presence of oxygen until a molten mass is obtained, then allowing the iron oxid thus obtained to solidify, and reducing it with a mixture of nitrogen and hydrogen.

In testimony whereof we have hereunto set our hands in the presence of two subscribing witnesses.

CARL BOSCH.
ALWIN MITTASCH.

Witnesses:
J. ALEC. LLOYD,
A. O. TITTMANN.